May 1, 1934.  A. O. PRICE  1,957,413

AIR CONTROL APPARATUS

Filed Oct. 30, 1933  3 Sheets-Sheet 1

INVENTOR:
ALBERT O. PRICE
By Saywell & Wesseler,
ATTORNEYS

May 1, 1934.  A. O. PRICE  1,957,413
AIR CONTROL APPARATUS
Filed Oct. 30, 1933  3 Sheets-Sheet 2
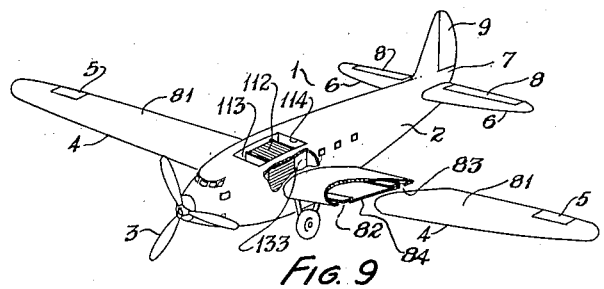
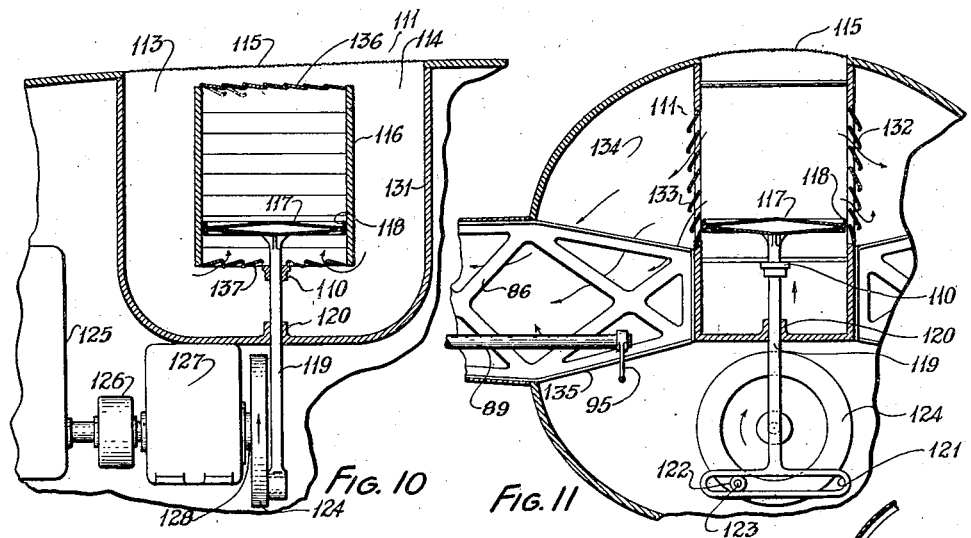
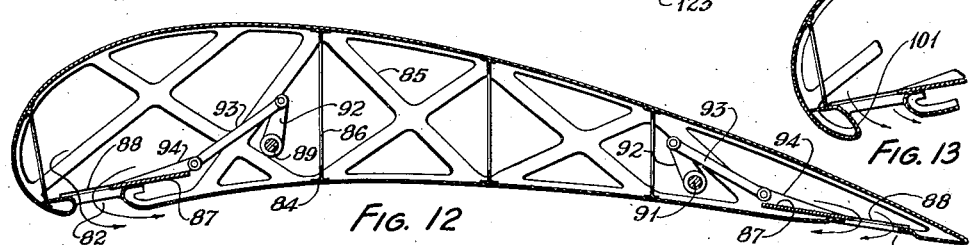
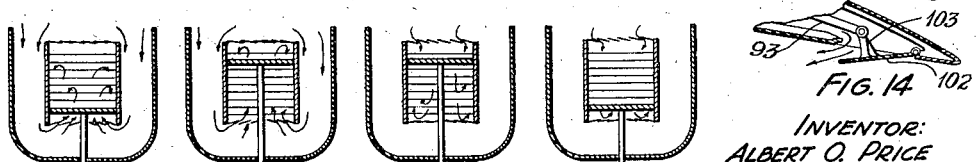
INVENTOR:
ALBERT O. PRICE
BY Saywell & Wesseler,
ATTORNEYS May 1, 1934.  A. O. PRICE  1,957,413
AIR CONTROL APPARATUS
Filed Oct. 30, 1933   3 Sheets-Sheet 3
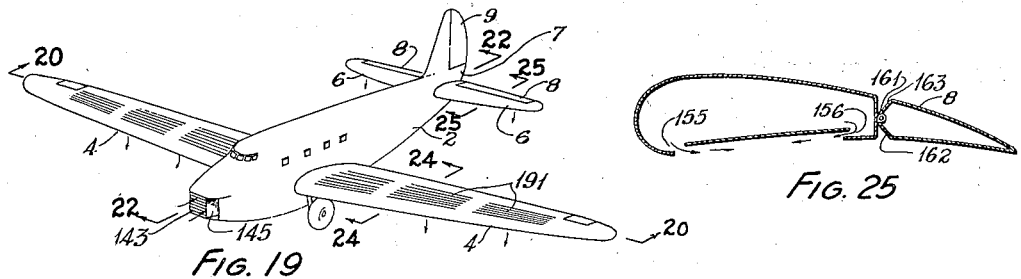
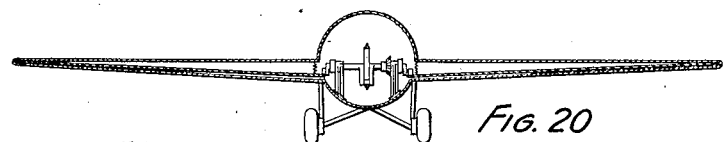
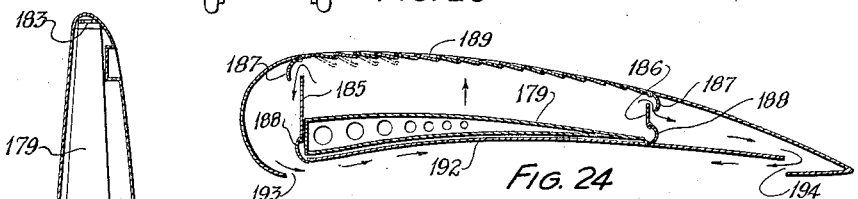
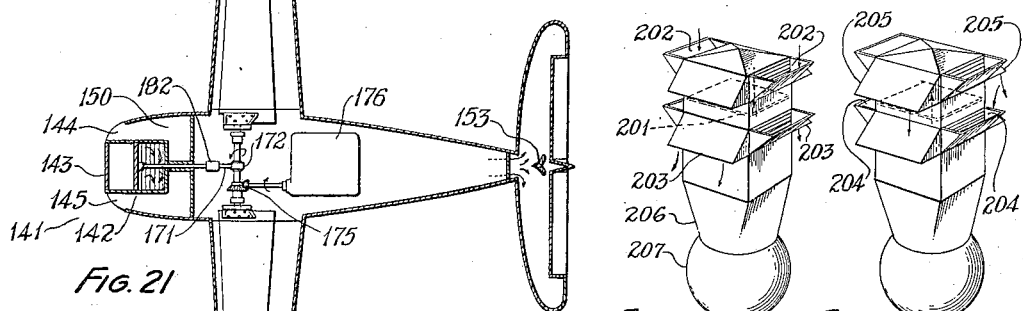
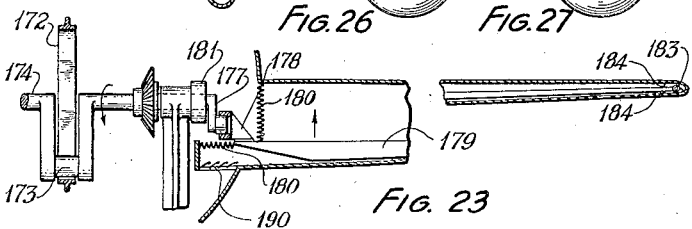
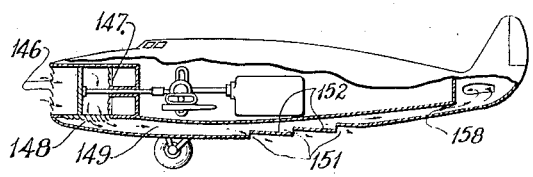
INVENTOR:
ALBERT O. PRICE
BY Sarywell & Wesseler,
ATTORNEYS Patented May 1, 1934

1,957,413

UNITED STATES PATENT OFFICE 1,957,413

AIR CONTROL APPARATUS

Albert O. Price, Leesville, Ohio, assignor by mesne assignments, to The Priceler Corporation, Cleveland, Ohio, a corporation of Ohio Application October 30, 1933, Serial No. 695,807

10 Claims. (Cl. 244—12)

This invention, as indicated, relates to an air control apparatus. More particularly, it comprises means for positively displacing air in large volume with a minimum of loss and substantial continuity of effect, especially in connection with the propulsion and control of aircraft.

The invention also contemplates the provision of certain structural features of aircraft adapted to permit the same to rise in the air more effectively and to descend under greater control and with more security than is possible with present types of aircraft. The invention also includes special air displacement and control apparatus combining lightness of construction with greater efficiency of performance, and the combination of structures of this type with apparatus in whole or in part of standard construction, whereby a more efficient operation and control may be had.

Heretofore, it has been proposed in connection with various types of aircraft to utilize currents of air actuated by fans and blowers directly or in association with special surfaces or conduits. In most instances, however, the apparatus proposed for such aircraft has been of such weight or has involved such slippage and other losses that no advantage has resulted from the use of such apparatus either alone or in conjunction with conventional types of equipment.

The principal object of the present invention is to provide an improved air control apparatus, particularly one wherein the air is handled by means effecting positive displacement of a quantity of air as distinguished from those wherein fans and blowers of various types are utilized.

Another object of the invention is to increase the buoyant effect of aircraft by means of an apparatus adapted to withdraw air from the forward and upper surfaces of an aircraft and to discharge such air beneath the same at predetermined points.

Another object of the invention is to provide in the wing portions of an aeroplane means for discharging air at the leading and trailing edges thereof and controlling the discharge of air over such under surface of the wing areas so as to reduce the amount discharged at either edge or at any desired point along such edge as a simultaneous or independent operation, or to prevent the discharge of air at such points as desired for the purposes either of control or propulsion.

Another object of the invention is to receive air currents over a surface of the aircraft through the upper or forward surfaces thereof and to induce adjacent such surfaces a low pressure or vacuum area to effect the support or propulsion of the aircraft.

A further object of the invention is to combine in a single control mechanism for the aircraft means for independently or simultaneously operating the various directive instrumentalities of the aircraft, such as ailerons, elevators, rudders and air intake and discharge members, so as to control the craft effectively with any or all of such instrumentalities as desired.

Another object of the invention is to provide two complete and independently controllable systems of aircraft sustension and propulsion, which may be operated simultaneously as a combined apparatus, or can be selectively operated with portions of such two systems of support and control for the aircraft, or with either system operating wholly independently of the other system. The invention also includes details of construction of the positive displacement apparatus for the air currents and the quantitative and directional control thereof.

A further object of the invention is to provide over certain areas of the aircraft means for producing areas of low pressure or areas of increased pressure, or various combinations of such areas independently or simultaneously so as to produce any desired directional or propulsive movement of the craft alone or in conjunction with other means of propulsion.

Another object of the invention is to use a positive displacement apparatus for handling the air received from above certain surfaces of the aircraft and discharging the same beneath other surfaces thereof under such conditions that the intake and discharge of such apparatus will be substantially continuous in action and equalized over such surfaces with a minimum of interruption or change of phase or location of such intake and discharge areas.

Another object of the invention is to produce an aircraft which may follow substantially conventional lines of aircraft construction, and, with standard sizes of wing areas, be capable of improved performance, such as slower landing, or greater flying speed, or more effective control in landing or taking off from restricted landing points.

Another object of the invention is to produce an aircraft having a positive air displacement means of larger size in proportion to the size of the craft upon which it is carried than has heretofore been found practical for any type of air displacement apparatus in order that flight may be undertaken in any desired direction.

Another object of the invention is to produce an apparatus which may be utilized in the form of a toy or for scientific air exploration under free flight, or with automatic directional control thereof.

Other and further objects of the invention will appear in the course of the following description.

To the accomplishment of the foregoing and related ends, said invention, then, consists of the means hereinafter fully described and particularly pointed out in the claims.

The annexed drawings and the following description set forth certain structures and mechanisms embodying the invention, such disclosed means constituting, however, but several of various structural and mechanical forms in which the principle of the invention may be used.

In said annexed drawings:

Figure 9 is a perspective view, partly in section, showing a modified form of aeroplane having features embodying the principles of the invention;

Figure 10 is an enlarged fragmentary longitudinal sectional view through the fuselage of the structure shown in Figure 9;

Figure 11 is an enlarged fragmentary transverse sectional view of the structure shown in Figures 9 and 10;

Figure 12 is an enlarged transverse sectional view through one of the cantilever wing members of the structure shown in Figure 9;

Figure 13 is an enlarged detail sectional view of a modified form of air discharge port for the leading edge of a wing structure of the type shown in Figure 12;

Figure 14 is an enlarged detail sectional view of a modified form of air discharge port for the trailing edge of a wing structure of the type shown in Figure 12;

Figures 15, 16, 17 and 18 are diagrammatic sectional views showing the cycle of operations of the air displacement apparatus illustrated in Figures 9, 10 and 11;

Figure 19 is a perspective view of a still further modified form of aeroplane embodying the features of the invention;

Figure 20 is a transverse sectional view, taken along the line 20—20, shown in Figure 19, looking in the direction of the arrows;

Figure 21 is a sectional plan view, taken through the structure shown in Figures 19 and 20;

Figure 22 is a view, partly in section, taken along the line 22—22, shown in Figure 19, looking in the direction of the arrows;

Figure 23 is an enlarged detail view of a portion of the structure shown in Figure 20 with the middle of the wing broken away;

Figure 24 is an enlarged transverse sectional view through the main wing, taken along the line 24—24, shown in Figure 19, looking in the direction of the arrows;

Figure 25 is an enlarged transverse sectional view through the tail wing, taken along the line 25—25, shown in Figure 19, looking in the direction of the arrows; and Figures 26 and 27 are prespective views of a modified form of structure embodying the principles of the invention, with the pump piston 80 shown in dotted lines.

Figure 1:
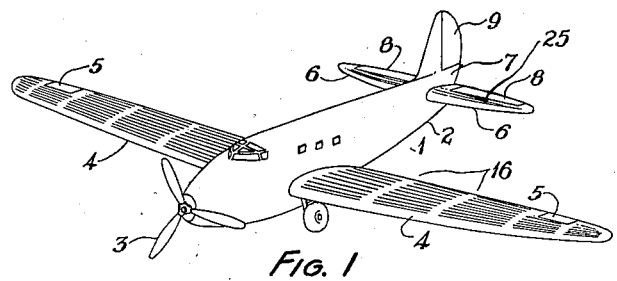
Figure 1 is a perspective view showing a conventional type of aeroplane provided with features embodying the principles of the invention.
Figure 2:
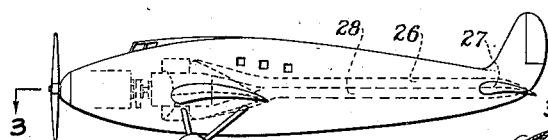
Figure 2 is a side elevation of the structure shown in Figure 1.
Figure 3:
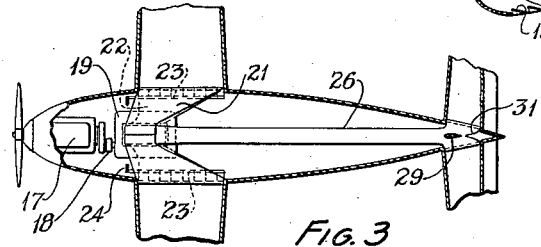
Figure 3 is a fragmentary plan view, partly in section, of the structure shown in Figures 1 and 2.
Figure 7:
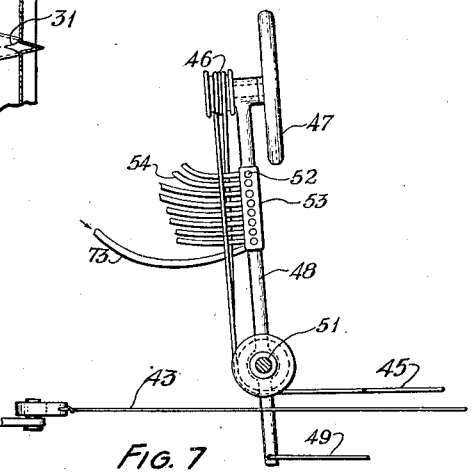
Figure 7 is an enlarged detail view showing the valve control associated with the standard aeroplane control members.

One form of construction embodying the principles of the invention is illustrated more particularly in Figs. 1 to 3, inclusive, wherein an aeroplane 1 of conventional shape is provided with a fuselage 2 having a propeller 3 at the forward end and side wings 4 having ailerons 5 at an intermediate position with a fixed stabilizing tailplane 6 at each side of the tail 7, having elevators 8 at the rear edges thereof and a vertical rudder 9.

Figure 5:
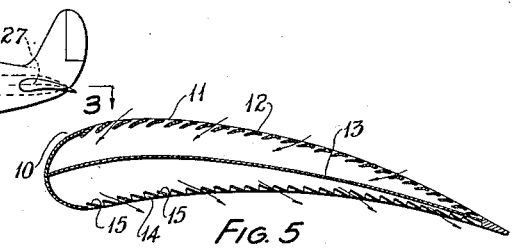
Figure 5 is an enlarged vertical section through one of the main wing structures shown in Figures 1 and 2.

Each of the wings 4 is formed of standard aerofoil shape, as shown in enlarged section in Figure 5, and preferably has the upper surface 10 thereof provided with a series of elongated slots 11 intermediate a series of overlapping slats 12 of suitable cross section to promote satisfactory airflow thereover. Centrally of the hollow wing a diaphragm 13 is provided, said diaphragm dividing the upper and lower areas of said wing so that air may be received through the slots on the upper side and discharged through openings on the under side thereof, as will presently be explained. The openings on the under side of the wing are somewhat different in shape from those on the upper side of the wing, the under surface of the aerofoil being somewhat of sawtooth cross section with apertures 14 between the inclined strips 15, into which the under side of the wing is formed. The wings preferably are formed of light metal which may be suitably reinforced as desired, but it is to be understood that other materials may be utilized and that combinations of metal or wood and cloth, or composition materials of various character may be utilized, as well as various trussing arrangements to increase the strength of the wing structure and yet not interfere with the intake and output of air through the same. In the form illustrated in Figure 1 the slots on the upper surface of the wing are arranged in groups extending transversely across the wing with an intermediate unslotted portion 16 between each group.

In the type of apparatus referred to each wing may be formed with a single compartment within the same or may be subdivided above and below the diaphragm 13 by transverse bulkheads below the unslotted areas 16 having separate conduits with individually operated shutters or valves controlling air intake or discharge respectively in each compartment.

The propeller is driven by any suitable means such as a gasoline engine 17 having a clutch 18 connecting it with a positive displacement type of air pump 19. The pump communicates with each of the wings adjacent thereto through suitable ducts or conduits, the suction duct 21 being over the wing diaphragm and the pressure duct beneath the same. Suitable shutters are provided to close communication with either of the conduits and the pump, the shutters 23 for the upper conduit being shown in Figure 3, together with the control lever 24 therefor. The tailplane is preferably provided on its upper side with openings 25 which communicate with the pump through a suction conduit 26 extending forwardly from the upper portion of each tailplane above the diaphragm 27 therein and the area beneath the diaphragm communicates by means of a conduit 28 with the pressure side of the pump. Valves similar to those in the conduits to the wings may be provided in the conduits connected with the upper and lower portions of the tailplanes. Each conduit in the tailplane may also be provided with a deflector 29 acting in conjunction with a fixed forwardly projecting fin 31 to control the quantity of air passing through either the pressure or suction duct to the right hand or left hand tailplane, as desired. The deflector in the suction conduit may be operated independently or simultaneously with the deflector in the pressure conduit through cables or other control means arranged in conventional manner.

Figure 4:
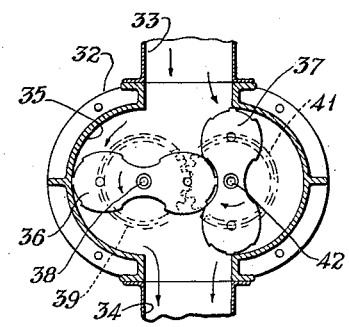
Figure 4 is a central vertical sectional view of one type of air displacing apparatus for use in the structure shown in Figures 1 to 3 inclusive.

The pump structure may take various forms, but that illustrated and preferably used is a positive displacement pump. This may take the form of a pump having a pair of rotors such as is shown in Figure 4, or a reciprocating plate or abutment such as is shown in Figures 10, 11 and 15 to 18. In the form of construction shown in Figure 4, the pump comprises a casing 32 having an inlet conduit 33 and a discharge conduit 34. The casing is of elliptical shape on its interior 35, the inner walls being engaged by the edges of a pair of rotors 36, 37. Each of the rotors is of "figure 8" cross section, with the edge of one rotor interfitting with the central portion of its companion rotor as the members rotate. The rotor 36 is mounted on the shaft 38 driven from the engine to which it is connected by means of the clutch 18 and intermediate gearing, not shown. A gear 39 mounted on the shaft 38 serves to drive the gear 41 mounted on the shaft 42 of the rotor 37. The contacting portions of the rotors are shaped to reduce friction and prevent loss of power through leakage.

Figure 8:
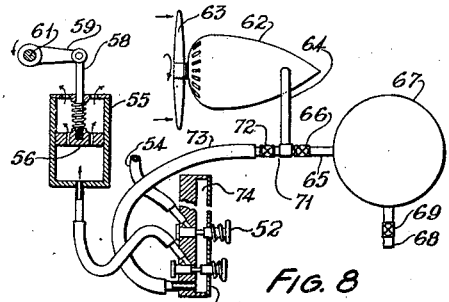
Figure 8 is a fragmentary diagrammatic view showing valve control of the air displacement system.
Figure 6:
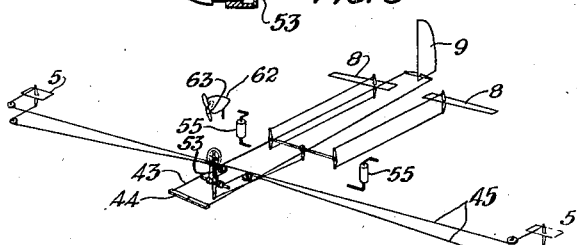
Figure 6 is a diagrammatic view showing a conventional type of aeroplane control with associated valve control.

The control of the structure above described may be accomplished in a number of ways, but preferably provides a control of conventional type, such as is shown in Figure 6, wherein the tail rudder 9 is controlled by cables 43 connected with a foot lever 44 and the ailerons 5 are controlled by cables 45 extending to a drum 46 operated by the steering wheel 47 supported on a steering column 48, which is pivoted for movement forwardly and rearwardly to control the elevators 8 through the rod and connections 49. The pivots 51 for the steering column 48 prevent rotation of the column upon its axis. The valves or shutters for controlling the admission and discharge of air through the various passageways heretofore described are preferably controlled by means of a pneumatic control in the form of a series of valves or keys 52 mounted in a case 53 supported on the steering column and connected by flexible members 54 with a valve actuating mechanism illustrated in detail in Figure 8. Said mechanism comprises the air cylinder 55, having a piston 56 therein formed with small bleed holes 57 to maintain the desired position of the piston. The piston is connected by means of a shaft 58 to an arm 59 secured to a shaft 61, which may extend directly or through suitable linkage to the point of application of the power to open and close the shutters. For example, it may be connected with the lever 24, shown in Figure 3, for actuating the shutter 23, or may be connected with either of the valve control rods 89, 91, shown in Figures 11 and 12 for actuating the slides controlling the passage of air through the slots below the leading and trailing edges of the wings. The pneumatic control system may be operated from any suitable source of high pressure air, but as shown in Figure 8, may be supplied from a high pressure compressor 62, which may be driven by means of a propeller member 63 or windmill receiving air from the propeller blast of the main driving propeller 3 of the aircraft, or through reaction of the air through which the aircraft is passing. The compressor casing is preferably stream lined, as shown, and may be of the positive displacement type so that the air conveyed therefrom through a conduit 64 and branch conduit 65 controlled by valve 66 may be stored in a storage tank or reservoir 67, from which it may be drawn in emergencies through a conduit 68 controlled by a valve 69 and utilized through the various conduits for high pressure air in the event of an emergency landing or other occasion for such use. Apart from the use of the compressor in filling the emergency tank, a branch conduit 71 may be provided, having a valve 72 with a flexible connection 73, whereby high pressure air may be supplied to the manifold 74 in the casing 53 and thence distributed by pressure on the valves or keys 52 through the various flexible conduits 54 connected with the individual valves of the discharge areas, as heretofore explained.

The form of construction shown in Figure 9 disclose an aircraft similar to that shown in Figure 1, but with the air intake area disposed above the fuselage in line with the wings, and the air discharge passageways comprising the entire wing structure having slots adjacent the leading and trailing edges thereof on the under side, controllable as will be hereinafter explained. The pump in the structure illustrated in Figure 9 comprises a reciprocating type of pump of the positive displacement form instead of the rotor type heretofore described and shown in full detail in Figure 4.

As is shown more particularly in Figure 9, the structure of the aeroplane illustrated in Figure 1 is provided with the conventional structural elements numbered to correspond with similar elements in Figure 1, but has closed upper wing areas 81, with the under side of the leading edge of the wing formed with a slot 82, with a similar slot 83 beneath the trailing edge of each wing. The central lower area 84 of the wing, as shown more particularly in Figure 12, comprises an unbroken surface intermediate the respective front and rearward slots, and may be in the form of a thin metal plate suitably fastened to internal transverse and longitudinal bracing members 85, 86, respectively, of the wings.

Each of the wing slots is adapted to be closed in whole or in part by means controlled from the pilots's position. In the form illustrated, a series of slides are provided between each transverse frame member 86. Each slide 87 is shown within the wing supported in guides in the form of slots 88 in the lower portion of the transverse frame member. Control of the slide valves is provided by a rod 89 for the forward valves and a rod 91 for the rearward valves. Adjacent each slide each rod is provided with an upstanding arm 92 pivotally connected by a link 93 with a rib 94 provided on the upper face of the slide. The inner end of each valve control rod is provided with an arm 95, connected by suitable linkage (not shown) with the rod 61 and its associated control mechanism shown in Fig. 8. Since the rod 89 for the forward slide valves, and the rod 91 for the rearward slide valves are independently connected with a separate air cylinder 55, the respective slots at the leading and trailing edges of the aerofoil may be opened or closed independently or simultaneously in any desired ratio. When the air is directed downward beneath the wings the air cushion for the aircraft will have increased supporting effect preliminary to the take-off, and will lessen the retarding effect of the parasitic air layer when the aircraft is in forward flight.

In order to cause the pressure air to exert a more powerful lifting effect, the forward portion of the wing may be provided with an extension edge 101, as shown in Fig. 13, providing an area of low pressure behind the same to be filled by the pressure air emerging from the slot at the leading edge and thus augmenting the quantity of air under pressure beneath the wing surface and providing for smooth air flow at such point. The air emerging from the rearward slot at the trailing edge of the wing may be directed forwardly toward the pressure air emerging from the slot at the leading edge by means of a pivoted closure member 102 hinged at its rearward edge and adapted to be moved downwardly by means of an upstanding arm 103 connected with the link 93 of the control mechanism heretofore described. The reaction of the two opposed air streams beneath the wings will exert an increased lifting effect, particularly as the aircraft is ready to leave the ground. After forward flight is commenced the closure at the rearward edge may be closed until it is desired to land when it may again be opened to provide greater buoyancy and a slower landing speed.

The pressure air for discharge through the slots 82 and 83 may be supplied from a pump of the type heretofore described and shown in Fig. 4, which might receive its air through conduits connected with the upper or forward surface of the aircraft at any desired points, but preferably is a reciprocating positive displacement pump 111 shown in detail in Figs. 10 and 11. This pump is shown as receiving air through openings at the top of the fuselage between the wings, but obviously could receive air through the upper portion of a wing having slots and a diaphragm such as is shown in Fig. 5.

The air intake through the top of the fuselage as shown in Figs. 9, 10 and 11, comprises a central area 112 of substantially square cross section, with two smaller areas 113, 114, immediately in front and behind such central area. Across the entire intake area, a screen 115 is preferably provided to act as an equalizing medium for the intermittent suction effect created by the reciprocating member of the pump, presently to be described. The screen is placed, preferably, in the plane of the top surface of the fuselage and the pump chamber 116 extends upwardly to a point slightly below the same to prevent interference with the equalizing action of the screen.

The pump chamber is shown as rectangular but obviously might be varied in form for special uses. The walls of the pump chamber may be of light sheet metal, or other material, such as wood, fabric, composition, or the like. The reciprocating abutment or piston 117 of the pump preferably has slight marginal clearance or light frictional contact with the inner walls of the pump chamber. It may be thinner at the margins than at the center, tapering outwardly as shown and preferably is provided with a marginal flange 118 projecting above and below the same, and serving to prevent free flow of air over the margins thereof. The piston is firmly secured to the upper end of a pump shaft 119 preferably of rectangular cross-section, and running through closely fitted guides, 110, 120, in the pump chamber and pump casing walls, which may be made substantially air tight. The lower end of the pump shaft is formed with a cross slot 121 engaged over a roller 122, supported on a driving pin 123, projecting outwardly from the face of the driving disc 124 of the power transmission mechanism.

Any suitable power unit may be employed such as a gasoline engine 125 connected by a clutch 126 with a speed reducer 127 with the shaft 128 carrying the driving disc 124.

A pump casing 131 is spaced from the pump chamber 116 at the front, rear, and bottom thereof to provide an air intake passageway to the under side of the pump chamber from the smaller intake areas 113, 114, at the top of the fuselage. The passageway is preferably curved on a long radius to provide for free air flow at the bottom. The sides of the pump chamber are provided with valved openings 132, 133, communicating with the wings through passageways in the fuselage having side walls 134 and bottom walls 135. Pressure relief valves (not shown) may be placed in the walls of this passageway to release excess pressure outwardly when the outlet valves beneath the wings are all fully closed. Like valves may be used wherever excess pressure may result through accident or improper handling of the mechanism.

The pump chamber, as stated, has valved openings 132, 133, at each of its sides, and also has valved openings 136, 137, at the top and bottom, respectively. All of the valves as shown are flap valves formed of overlapping strips of any suitable sheet material that is light, strong and substantially air tight, such as thin metal, rubberized composition, fabric over screening and the like. They are preferably held closed by light springs (not shown). The top and bottom valves 136, 137, open inwardly into the pump chamber and the side valves 132, 133 open outwardly.

The cycle of operations of the pump is shown in Figs. 15 to 18, inclusive, the arrows indicating the direction of piston movement and air flow through the inlet and discharge passageways. It will be noted that upon the upstroke the air is drawn into the smaller intake areas and into the casing 131 and through the bottom valve 137. The air above the piston is being forced through the side valves 132, 133, into the wings and through the slots 82, 83, adjacent the bottom edges in proportion to the respective degrees of opening of said slots. The top flap valves 136 of the pump chamber are closed. The side valves close progressively from the bottom as the piston rises due to the low pressure effect of the piston movement and valve arrangement, as is shown in Fig. 16. When the piston starts downwardly, the top valves 136 open and the bottom valves 137 close. A low pressure effect is induced at the top surface of the piston and above the screen. The upper side valves progressively close from the top as the piston descends, the lower side valves remaining open to receive pressure air from the underside of the piston until it progressively moves past their position. Thus air is positively displaced in large volume into the wings on both the up and down strokes of the pump and at the same time a low pressure effect is created at the intake area above the screen 115, first over the smaller intake areas and then over the central area, and so on in continuous succession.

Still another embodiment of the principle of the invention is shown in Figs. 19 to 25, the pumping action being effected directly in the wings themselves and the apparatus thus presenting a light, low speed, high capacity pump positioned for direct action without extended transmission passageways. It is also shown with a forward propulsion unit of the reciprocating positive displacement pump type adapted to provide an area of low pressure at the front of the air craft and an air cushion under the fuselage and below the rearward portion of the aircraft through openings below the fixed horizontal tail plane.

The general type of aircraft shown in Fig. 19 is similar to that illustrated in Figs. 1 and 9 and like reference characters have been applied to similar structural elements thereof.

In place of a rotating propeller at the forward end of the structure as in the other forms shown and above described, forward flight is provided for by a positive displacement pump, the type illustrated being a reciprocating pump 141 similar in its structural details to the pump shown in Figs. 10 and 11, but with the pump chamber 142 positioned horizontally instead of vertically and having the central air intake area 143 and the adjacent smaller air intake areas 144, 145, at the front instead of at the top of the structure. The inwardly opening valves 146 and 147 are at the front and rearward ends of the pump chamber, the latter supplied through the spaced pump casing 150, and the discharge valves 148 are shown as being only on the under side of the pump chamber in the construction shown, discharging pressure air into a conduit 149 on the under side of the fuselage. The pressure air may be released in whole or in part from the underside of the conduit through openings 151 in the stepped off sections 152 of the bottom of the fuselage. The openings may be provided with closures and controls therefor similar to the slide valves and controls shown in Fig. 12. With such valve control all or part of the pressure air in the conduit may be carried into the fixed horizontal tail planes as shown in Figs. 21 and 22, being directed thereinto by an inverted V-shaped deflector 153 into the hollow plane 154 and emerging through slots 155, 156, at the front and rear edges of the tail planes, below the upwardly displaced central lower wall 157 of the plane structure. A suitable valve 158 may be provided in the conduit adjacent the tail plane, whereby the air may be confined to the conduit and the openings in the stepped-off sections of the bottom and not discharged through any portion of the tail plane structure.

The tail plane construction, as shown in Fig. 25, may be a hollow metal box-like structure with its elevator 8 at the rear and having the conventional shape of an aerofoil. The elevator may be supported upon a horizontal pivot 161 and have beveled portions 162, 163, adjacent thereto to permit freedom of movement. It will be noted that the air emerging from the hollow portion of the fixed tail plane is directed rearwardly through the forward slot and forwardly through the rearward slot, such air currents meeting centrally beneath such tail plane and having an increased lifting effect.

The pump at the forward end of the aircraft may be driven in any desired manner, but, as shown, the pump shaft 171 is provided with a slotted terminal portion 172 engaged by the crank member 173 of the main driving shaft 174, which is operated through suitable gearing 175 by an engine, preferably a gas engine, 176. The ends of the main shaft are provided with cranks 177 at each end engaging slotted brackets 178 secured to a reciprocating pump blade or abutment 179 mounted in each of the main wings. Bellows-like seals 180, preferably reinforced against lateral displacement, are provided at the front edge of said blade and intake valves 190 are provided intermediate the end of the blade and the inner fuselage wall to admit air to the underside of the blade during the upstroke, air being conducted thereto through a casing extending to the upper surface, if desired, or air may be withdrawn through a conduit connected with the chamber 150.

A clutch 181 is interposed between the shaft and each end crank, and a sleeved clutch 182 is provided on the main shaft of the forward pump whereby it may be disconnected from the driving mechanism.

Each of the wing blades 179 is provided with a hinge 183 at the outer end of the wing and is sealed inwardly of said hinge by means of a bellows type seal 184 above and below the same. The sides of the wing blade 179 have close clearance with the sides of the box-like chamber within the central portion of the wing formed by end walls 185, 186. Said end walls have outwardly opening valves 187 at the upper edges thereof and similar valves 188 at the lower edges thereof. The upper wall of the wing structure is provided with inwardly opening flap valves 189 which may be distributed in several sections 191, as shown in Fig. 19. The bottom wall 192 of each wing is imperforate, but stops short of the edge portions of the wing, which extend slightly below the same so as to provide discharge passageways 193 and 194 at the forward and rear edges, respectively, through which pressure air may be ejected. It will be noted that as the blades are moved up and down in the wings, that pumping action will take place immediately in the wing structure, low pressure air being drawn through the flap valves alternately at the top and end thereof and discharged beneath the wing structure through the slots 193, 194. Thus, with an aerofoil of substantially conventional shape an additional buoyancy can be supplied to the wing members and greatly enhance the carrying capacity of the aircraft or its ability to maneuver or to operate more effectively with smaller sized structural elements.

The structure shown in Figures 26 and 27 embodies the simplest form of reciprocating bellows type, positive displacement aircraft, wherein the reciprocating member 201 on the downstroke, as shown in Fig. 26, receives air through upwardly directed chutes 202 at each side of the top thereof, and discharges air through downwardly directed chutes 203 at either side of the bottom thereof, and at right angles to the position of first-named chutes.

On the upstroke the air is drawn inwardly through the upwardly directed chutes 204 adjacent the bottom thereof and is discharged through the downwardly directed chutes 205 adjacent the top thereof. Each of the chutes is provided with inwardly opening flap valves for the intake chutes and with outwardly opening flap valves for the discharge chutes, similar to the inwardly opening valves 136, 137, shown in Fig. 10 of the drawings, and the outwardly opening valves 132, 133, shown in Fig. 11 of the drawings. An engine compartment 206 is supplied beneath the structure and a car 207 below the same, such car being equipped with any desired means of adjusting its angular position relative to the superstructure.

While the flap valves illustrated have been shown as overlapping, various types of flap valves may be used, including openings having a pair of valves meeting in angular relation and having relatively short paths of movement to full opening, or sheets of rubberized or like material confined between screens or open mesh membranes restricting the opening of the valves, as well as facilitating the closing of the opening, in airtight relation when the pressure of the chamber reverses.

The type of apparatus shown in Figs. 26 and 27 may be utilized as a toy or as a device for exploring the stratosphere for scientific purposes. In such event it may be desirable to provide a gas generating or storage air supply, such as a liquid air tank within the structure and release the air through the downwardly directed ducts of the apparatus.

It is also to be understood that the storage tank 67 shown in Fig. 8 may be initially filled with compressed air, gas, or the like, and supply same to the various discharge openings of the apparatus without the intervention of the pumping apparatus.

Where an aircraft is supplied with both a pumping apparatus and a storage tank, the tank may be used for emergency requirements, as heretofore stated, or may be used in regular flight and the pump thrown into action when the pressure air supply in the tank falls below the required amount.

Other modes of applying the principle of my invention may be employed instead of those explained, change being made as regards the structure herein disclosed, provided the means stated by any of the following claims or the equivalent of such stated means be employed.

I therefore particularly point out and distinctly claim as my invention:

1. An aeroplane of conventional design having wings, stabilizing planes, ailerons, elevators, and rudder, and controls therefor, and a double acting reciprocating positive displacement apparatus built into a wing and forming a part thereof for withdrawing air from an area adjacent one surface thereof and discharging such air adjacent another surface thereof, at each reciprocating stroke of said apparatus.

2. An aeroplane of conventional design having wings, stabilizing planes, ailerons, elevators, and rudder, and controls therefor, and a double acting reciprocating positive displacement apparatus built into a wing and forming a part thereof for withdrawing air from an area above the wings of said aeroplane and discharging such air beneath said wings at each reciprocating stroke of said apparatus.

3. An aeroplane of conventional design having wings, stabilizing planes, ailerons, elevators, and rudder, and controls therefore, a double acting reciprocating positive displacement air pump built into a wing and forming a part thereof, means for supplying air to said apparatus from areas above the same, means for discharging air from said apparatus to areas beneath said aeroplane at each reciprocating stroke of said apparatus, and means for selectively controlling the intake and discharge of air over said areas.

4. An aeroplane of conventional design having wings, stabilizing planes, ailerons, elevators, and rudder, and controls therefor, a double acting reciprocating positive displacement air pump built into a wing and forming a part thereof, means for supplying air to said apparatus from areas above the same, means for discharging air from said apparatus to areas beneath said aeroplane at each reciprocating stroke of said apparatus, and means associated with the conventional controlling means for selectively controlling the intake and discharge of air over said areas.

5. An aeroplane of conventional design having in combination a fuselage, a propeller for driving the same, wing and stabilizing planes supported on said fuselage, horizontal and vertical guiding means for said aeroplane, a double acting reciprocating positive displacement air pump built into a wing and forming a part thereof, and connections with the upper surfaces of said wings for drawing air into said pump at each reciprocating stroke thereof to increase the lifting effect over said wing surfaces.

6. An aeroplane of conventional design having in combination a fuselage, a propeller for driving the same, wing and stabilizing planes supported on said fuselage, horizontal and vertical guiding means for said aeroplane, a double acting reciprocating positive displacement air pump built into a wing and forming a part thereof, and connections with the upper surface of said aeroplane for drawing air into said pump at each reciprocating stroke thereof to increase the lifting effect on said wings over said surface.

7. An aeroplane of conventional design having in combination a fuselage, a propeller for driving the same, wing and stabilizing planes supported on said fuselage, horizontal and vertical guiding means for said aeroplane, a double acting reciprocating positive displacement air pump built into a wing and forming a part thereof, connections with a plurality of intake openings in the upper surface of said aeroplane for drawing air into said pump at each reciprocating stroke thereof to increase the lifting effect on said plane over said surface, and means for selecting the specific intake openings through which said air is withdrawn.

8. An aeroplane having in combination a fuselage, a plurality of wings mounted thereon, means for propelling such aeroplane, a positive displacement apparatus to supply pressure air in said aeroplane, a slot beneath the leading edge of each of said wings, a slot beneath the trailing edge of each of said wings, means for independently opening and closing said slots, and passageways from said source of air to the respective wings for discharging air through said slots and beneath said wings.

9. An aeroplane having in combination a fuselage, a plurality of wings mounted thereon, means for propelling such aeroplane, a source of pressure air in said aeroplane, a slot beneath the leading edge of each of said wings, a slot beneath the trailing edge of each of said wings, means for opening and closing said slots selectively and independently, and passageways from said source of air to the respective wings for discharging air through said slots and beneath said wings.

10. An aircraft comprising a body, members projecting outwardly therefrom, a reciprocating pump within said body, inlet valves in side walls of said body communicating with upper surfaces of said projecting members, and progressively operating outlet valves in the side wall of said body discharging below lower surfaces of said projecting members.

ALBERT O. PRICE.